United States Patent [19]

Portmann

[11] 4,156,387
[45] May 29, 1979

[54] APPARATUS FOR MASS COMPENSATION AT A MACHINE DRIVEN BY A CRANK DRIVE

[75] Inventor: August T. Portmann, Arbon, Switzerland

[73] Assignee: Bruderer AG, Arbon, Switzerland

[21] Appl. No.: 875,037

[22] Filed: Feb. 3, 1978

Related U.S. Application Data

[63] Continuation of Ser. No. 602,049, Aug. 5, 1975, abandoned.

[30] Foreign Application Priority Data

Sep. 3, 1974 [CH] Switzerland .................... 11980/74

[51] Int. Cl.$^2$ .................................................. B30B 5/00
[52] U.S. Cl. .................................... 100/257; 74/603;
83/530; 83/615; 83/632; 100/282
[58] Field of Search ............... 74/571 M, 603; 83/530,
83/626, 632, 615, 637, 634, 625; 100/257, 282, 283

[56] References Cited

U.S. PATENT DOCUMENTS

| | | | |
|---|---|---|---|
| 1,569,569 | 1/1926 | Pels | 83/632 |
| 3,373,596 | 3/1968 | Moeller | 100/257 |
| 3,765,266 | 10/1973 | Portmann | 83/530 |
| 3,785,282 | 1/1974 | Kamelander | 100/257 |

FOREIGN PATENT DOCUMENTS

| | | | |
|---|---|---|---|
| 2241538 | 4/1973 | Fed. Rep. of Germany | 83/615 |
| 427442 | 6/1967 | Switzerland. | |

*Primary Examiner*—Abraham Hershkovitz
*Attorney, Agent, or Firm*—Ladas, Parry, Von Gehr, Goldsmith & Deschamps

[57] ABSTRACT

An apparatus for the mass compensation at a machine driven by means of a crank drive including a crankshaft, especially a punch press or stamping machine, comprising at least one compensation weight which is connected with a piston or cross-head and the crank drive in order to realize a mass compensation both of the oscillating masses and of the rotating masses. A double-lever is hingedly connected by means of its one end with the compensation weight in order to realize mass compensation of the rotating masses and is hingedly connected by means of its other end with the crank drive via a first guide or link. The one end of the double-lever is directly connected at the compensation weight, and an intermediate bearing means of the double-lever is hingedly connected via a second guide or link, directed towards the side of the crank shaft, with the machine housing or a component fixedly connected therewith.

5 Claims, 2 Drawing Figures

APPARATUS FOR MASS COMPENSATION AT A MACHINE DRIVEN BY A CRANK DRIVE

CROSS-REFERENCE TO RELATED APPLICATION

This is a continuation of co-pending application Ser. No. 602,049 filed Aug. 5, 1975 and now abandoned.

BACKGROUND OF THE INVENTION

The present invention relates to a new and improved construction of apparatus for the compensation of masses, also referred to herein as mass compensation, at machines driven by means of a crank drive, especially punch presses or stamping machines.

Generally speaking, the aforementioned mass compensation apparatus is of the type comprising at least one compensation weight which is connected through the agency of a rod mounted at the machine housing with a piston or crosshead and the crank drive in order to realize mass compensation of both the oscillating masses and the rotating masses. A double-lever of the rod is hingedly connected by means of its one end with the compensation weight for realizing mass compensation of the rotating masses and with its other end is hingedly connected via a first guide or link with the crank drive.

According to a prior art apparatus of this type as taught, for instance, in Swiss Pat. No. 427,442, the one end of the double-lever of the rod is connected via a guide or link with the associated compensation weight for producing the mass compensation of the rotating masses. The intermediate bearing of the double-lever is directly supported in the machine housing.

With this arrangement during adjustment of the stroke of the crank drive there thus results an error in the extreme positions during the movement of the compensation weight for compensating the rotating masses. The mass compensation is thus no longer accurate.

SUMMARY OF THE INVENTION

It is a primary object of the present invention to provide an improved apparatus for mass compensation at machines driven by a crank drive which is not associated with the aforementioned drawbacks and limitations of the prior art proposals discussed above.

Another object of the present invention aims at the provision of a new and improved construction of apparatus for compensating the masses at machines driven by a crank drive in a manner free of the aforementioned error.

Now in order to implement these and still further objects of the invention, which will become more readily apparent as the description proceeds, the apparatus of this development is manifested by the features that one end of the double-lever is directly connected at the compensation weight, and the intermediate bearing of the double-lever is hingedly connected via a second guide directed towards the side of the crankshaft at the machine housing or at a component fixedly connected therewith.

The component fixedly connected at the machine housing, at which there is hingedly connected or articulated the second additional guide according to the invention, can be advantageously constituted by a transverse carrier or support which reinforces the machine housing and extends in the plane of the stroke of the drive parallel to the crankshaft of the crank drive. In the transverse carrier or support there can be additionally accommodated a blocking device or mechanism for the stroke adjustment of the crank drive.

Further, in this transverse support there can be housed a central lubricating oil supply for all hinge locations or hinge connections of the double-lever and the associated guides or links.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
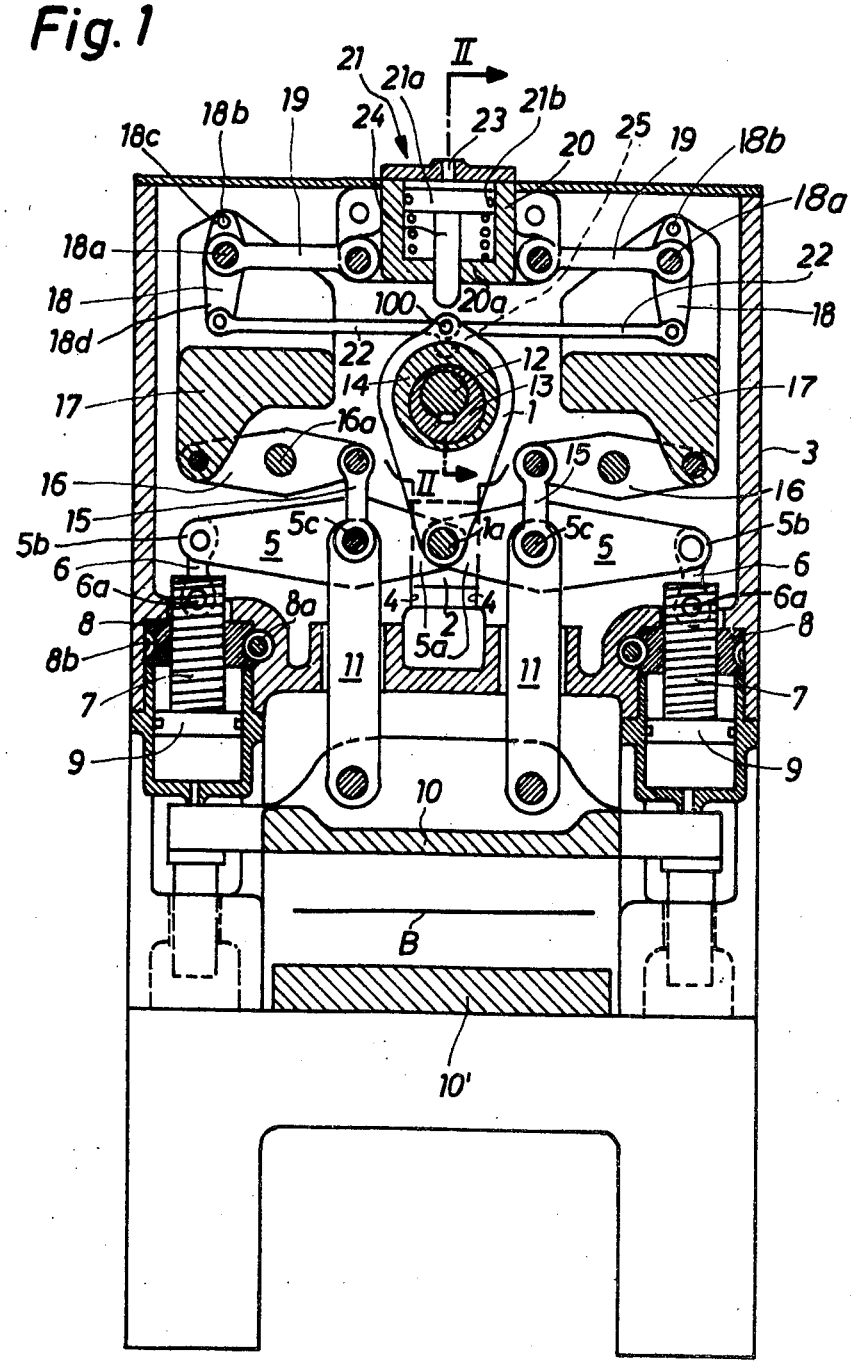
FIG. 1 is a vertical sectional view through a press punch or stamping machine driven by means of a crank drive equipped with a mass compensation apparatus designed according to the teachings of the present invention.

Describing now the drawings, wherein it should be understood only enough of the punch press structure has been shown to enable those skilled in the art to understand the principles of the invention, it will be seen that a driven crankshaft 12 which is conventionally mounted in bearings of a machine housing 3 of the punch press or stamping machine—hereinafter simply conveniently referred to as a punch press—acts through the agency of a connecting rod 1 upon a crosshead 2 which is slidingly guided in suitable slide guides 4 of the machine housing 3.

At the connection point or hinge means 1a connecting the connecting rod 1 with the crosshead 2 there are hingedly mounted the one respective end 5a of single-arm levers 5 which extend to both sides of the crosshead 2. The other ends 5b of the single-arm levers 5 are hingedly connected via control levers or guides 6—also referred to sometimes as links—with threaded spindles 7. These threaded spindles 7 are supported through the agency of nut members 8 in the machine housing 3, and which nut members 8 are held in the machine housing so as to be axially non-displaceable yet rotatable. For instance, each nut member or nut 8 is adjustable by means of a worm drive or the like, the worm pinion being indicated by reference character 8a and the worm gear at the periphery of the nut member 8 by reference character 8b. Each threaded spindle 7 can be loaded through the agency of a piston 9 which can be impinged with a pressurized fluid medium and thus can be fixed in the machine housing 3. Although during operation of the punch press the piston 9 is continually impinged with the pressurized medium, this pressure is diminished for the adjustment of the stroke of the drive, so that by rotating the nut members 8 the threaded spindles 7, which are prevented from rotating by a not particularly illustrated means, are raised or lowered and thus the position of the hinge point or hinge connection 6a of the guide or link 6 at the associated threaded spindle 7 can be altered and each of which hinge points during operation of the punch press act as a fixed point.

The intermediate bearings or support locations 5c of the single-arm levers 5 are connected by means of pressing or connecting rods 11 with a press ram or ram member 10. During driving of the crosshead 2 in a downward direction the intermediate supports or bearings 5c of the levers 5 and thus the pressing or connecting rods 11 together with the ram 10 are likewise displaced downwardly towards a stationary lower table 10' of the punch press in order to be able to punch out parts by means of a not particularly illustrated conventional stamping or punch tool from a workpiece, for instance in the form of a strip or band B which is displaceable between the table 10' and the ram 10 in a given plane of travel.

With the illustrated exemplary embodiment two pressing or connecting rods 11 engage at the ram 10. Consequently, there is formed a so-called "two-point drive". When arranging in each instance two substantially parallel single-arm levers or a wide lever 5 at each side of the crosshead 2 there can be provided for each lever pair or each wide lever two respective pressing or connecting rods 11 for connection with the ram 10. There is then realized a so-called "four-point drive" of the ram 10. Further details of such an arrangement are disclosed in the commonly assigned U.S. application Ser. No. 599,261, filed July 25, 1975, now U.S. Pat. No. 3,998,498 entitled "Apparatus For Guiding A Ram Within The Machine Frame Of A Punch Press Or The Like", the disclosure of which is incorporated herein by reference. With the embodiment shown in FIG. 1 the connecting rod 1 of the crankshaft 12 is driven by means of an internal eccentric member 13 connected rigidly therewith and an eccentric bushing or sleeve 14 arranged externally upon such eccentric member 13. The internal or inner eccentric member 13 and the external eccentric bushing or sleeve 14 can be rotated with respect to one another for adjusting the stroke of the drive. Instead of this arrangement the connecting rod 1 also could be driven in a different manner, for instance directly by the offset or crank portion of a crankshaft.

Further, the crosshead 2, instead of being driven by means of a single connecting rod 1, can be driven by means of two or more essentially parallelly arranged connecting rods.

Finally, instead of the respective guide or link 6 for connecting the outer ends 5b of the single-arm levers 5 with the threaded spindles 7, there can be provided a sliding block connection by means of a guide for the sliding block, which guide extends transversely with respect to the associated threaded spindle 7. The pressurized medium for impinging the pistons 9 at the ends of the threaded spindles 7 is advantageously constituted by the hydraulic work medium of a hydrostatic drive or transmission which is provided in any case for the drive. With this drive or transmission, with increasing rotational speed of the machine, the pressure acting upon each piston or piston member 9 automatically increases, something which is particularly advantageous. The impingement of the pistons 9 with a hydraulic pressurized medium additionally renders possible a relatively small piston cross-section or area of the pistons 9 owing to the high pressures which can be realized.

With the intermediate bearing 5c of each single-arm lever 5 there is connected via a guide or link 15 the one end of a double-lever 16 which is hingedly connected by means of its intermediate support location or bearing 16a at the machine housing 3 and at its other end at a compensation weight or mass 17. Instead of using each such guide or link 15 there also can be provided an eccentric crank for connecting the intermediate bearing 5c of each single-arm lever 5 with the double-lever 16.

At each compensation weight 17 there is directly hingedly connected at the hinge or pivot means 18b the one end 18c of a further double-lever 18, the other end 18d of which is hingedly connected at location 100 via a first guide or link 22 with the connecting rod 1. The intermediate support or bearing 18a of each double-lever 18 is hingedly connected via a second guide or link 19 at a transverse support or carrier 20 which extends in the plane of the work or drive stroke essentially parallel to the crankshaft 12, this transverse support 20 being fixedly connected with the machine housing 3. A blocking mechanism 21 is housed in the transverse support 20. This blocking mechanism 21 encompasses a piston 21a which is displaceable against the force of a compression or pressure spring 21 by means of pressurized medium delivered through an opening or port 23. The piston 21a carries a plunger 24 which protrudes through the base or floor 20a of the transverse support 20 and when the piston 21a is advanced coacts with a blindhole bore 25 in the eccentric bushing or sleeve 14 for the fixation thereof when adjusting the stroke of the crank drive.

Figure 2:
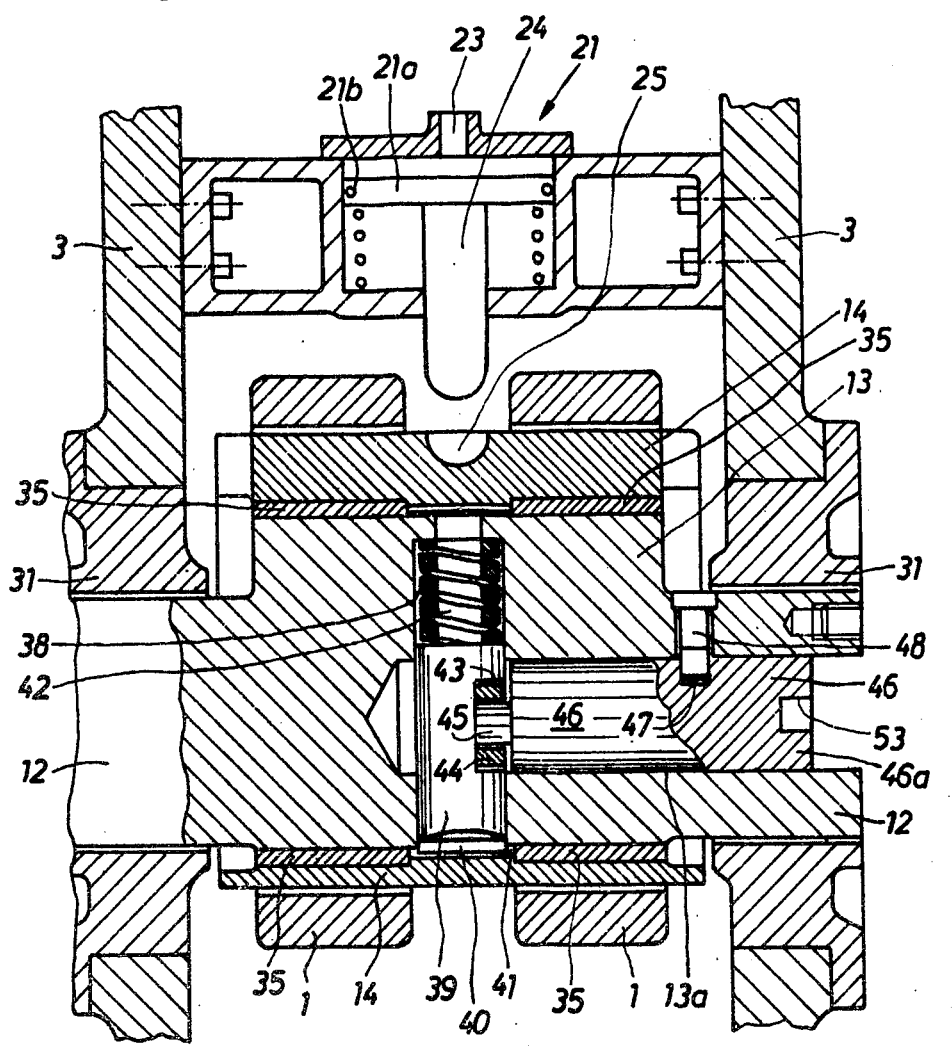
FIG. 2 is a partial sectional view taken substantially along the line II—II of FIG. 1 illustrating a number of constructional modifications which are not crucial to the basic concepts of the invention.

This will be more fully explained hereinafter in conjunction with the adjustment possibility of the eccentricity and thus the stroke of the crank drive on the basis of the showing of FIG. 2. With the embodiment according to FIG. 2 the driven crankshaft 12 mounted in bearings 31 of the machine housing 3 is formed of one piece or integral with the inner eccentric or eccentric member 13. The outer eccentric bushing or sleeve 14 is rotatably mounted upon such inner eccentric member 13 by means of the bearings 35. The eccentric bushing 14 mounts two connecting rods 1.

In a radial bore 38 of the inner eccentric 13 there is guided a locking pin 39 possessing teeth 40 at one end which mesh with inner teeth 41 of the eccentric sleeve or bushing 14. Acting at the other end of the locking pin 39 is a compression spring 42 which is housed in the bore 38, this compression spring 42 pressing the teeth 40 at the locking pin 39 into meshing engagement with the inner teeth 41 of the eccentric sleeve or bushing 14 and thus fixedly retaining the eccentric bushing or sleeve against rotation upon the inner eccentric member 13. The locking pin 39 has a recess 43 with which engages via a bushing or sleeve 44 an eccentric pin 45 provided at an adjustment spindle 46 which is rotatably mounted in an axial bore 13a of the inner eccentric member 13 and the crankshaft 12. This adjustment spindle 46 possesses an annular or ring-shaped groove 47 which extends through an angle of about 180° and with which engages a stop or impact bolt 48 which is threaded into the crankshaft 12 in order to limit the rotation of the adjustment spindle 46 in its terminal or end positions. The adjustment spindle 46 is provided at its outwardly directed end 46a with a transverse groove 53 with which there can engage a not particularly illustrated cam or the like of an adjustment mechanism. By rotating the adjustment spindle 46 the locking pin 39 can be displaced against the force of the spring 42 in such a manner that the teeth 40 are brought out of meshing engagement with the internal teeth 41.

In order to change the eccentricity of the double eccentric formed by the inner eccentric member 13 and the eccentric bushing or sleeve 14 and thus the drive or work stroke of the crank drive, the plunger 24 is pushed into the blindhole bore 25, so that the eccentric bushing or sleeve 14 is fixedly retained. Then by rotating the adjustment spindle 46 the teeth 40 of the locking pin 39 are brought out of engagement with the internal teeth 41 of the eccentric bushing 14. Now by means of the not particularly illustrated adjustment mechanism the crankshaft 12 with the inner eccentric can be rotated relative to the fixedly held eccentric bushing 14. Consequently, there is adjusted the eccentricity and thus the stroke of the crank drive.

The transverse support 20 additionally contains a central lubricant oil supply with lubricant bores (not shown) leading to all hinge points of each double-lever 18 and the guide or links 19 and 22.

Rotation of the crankshaft 12 causes an up and down movement of crosshead 2 in a manner well known for crank drives. This movement of the crosshead 2 causes a corresponding pivoting movement of levers 5, which rotate about their ends 5b connected to links 6. Movement of crosshead 2 in the upward direction causes an upward movement.

While there is shown and described present preferred embodiments of the invention, it is to be distinctly understood that the invention is not limited thereto, but may be otherwise variously embodied and practiced within the scope of the following claims.

Accordingly, what is claimed is:

1. A machine comprising:
   a machine housing;
   a crank drive mounted within the machine housing and including a crankshaft;
   a member connected drivingly to the crank drive so as to be reciprocated thereby along an axis defined by the machine;
   adjustment means whereby the position along said axis of the mean position of said member during reciprocation thereof may be adjusted;
   at least one compensation mass; and
   rod means connecting said compensation mass with said member, with said adjustment means and with said crank drive, said rod means including lever means connecting said compensation mass with said member, whereby reciprocation of said member is accompanied by reciprocation of said compensation mass, and the rod means further including a first rod, a second rod, and an elongate double lever having one end hinged directly to said compensation mass, having its other end hingedly connected to said crank drive through said first rod, and being connected at a position intermediate its ends to said machine housing through said second rod, said second rod extending away from said double lever in a direction towards said crankshaft.

2. A machine as claimed in claim 1, wherein the crank drive includes a connecting rod and said first rod has one end connected to said double lever and its other end connected to said connecting rod.

3. A machine as claimed in claim 1, wherein said first rod has one end connected with the crankshaft and its other end connected with said double lever.

4. A machine as claimed in claim 1, further comprising a transverse support fixedly connected to said machine housing to provide reinforcement therefor and extending in a plane substantially parallel to the plane of said crankshaft, said second rod having one end hingedly connected to said transverse support and its other end hingedly connected to said double lever.

5. A machine as claimed in claim 4, wherein said transverse support accommodates a locking mechanism for fixing a component of the crank drive against rotation thereby to facilitate adjustment of the stroke of the crank drive.

* * * * *